(12) United States Patent
Orman

(10) Patent No.: US 7,102,516 B2
(45) Date of Patent: Sep. 5, 2006

(54) ULTIMATE PROTECTION PORTFOLIO

(75) Inventor: Suze Orman, 320 E. 57th St., #9E, New York, NY (US) 10022

(73) Assignees: Suze Orman, New York, NY (US), Trustee of the Suze Orman Revocable Trust, dated May 11, 1998; Hay House, Inc., Carlsbad, CA (US)

( * ) Notice: Subject to any disclaimer, the term of this patent is extended or adjusted under 35 U.S.C. 154(b) by 147 days.

(21) Appl. No.: 10/889,748

(22) Filed: Jul. 13, 2004

(65) Prior Publication Data

US 2006/0011436 A1      Jan. 19, 2006

(51) Int. Cl.
*G08B 13/14* (2006.01)

(52) U.S. Cl. ................... 340/570; 340/693.5; 340/321; 206/307; 206/307.1; 206/308.1; 206/308.3

(58) Field of Classification Search ................ 340/570, 340/693.5, 321, 332; 206/738, 307, 307.1, 206/308.1, 308.3
See application file for complete search history.

(56) References Cited

U.S. PATENT DOCUMENTS

| | | | |
|---|---|---|---|
| 4,541,545 A | 9/1985 | Beattie et al. | |
| 5,720,389 A | 2/1998 | Yamazaki et al. | |
| 5,977,875 A * | 11/1999 | Lin et al. | ................ 340/570 |
| 6,561,671 B1 | 5/2003 | Wang et al. | |
| 6,571,056 B1 | 5/2003 | Shimamura et al. | |
| 6,846,090 B1 * | 1/2005 | Smith | ................ 362/99 |
| 2005/0072644 A1 * | 4/2005 | Gormick et al. | ................ 190/111 |

* cited by examiner

*Primary Examiner*—Julie Bichngoc Lieu
(74) *Attorney, Agent, or Firm*—Pillsbury Winthrop Shaw Pittman LLP

(57) ABSTRACT

A waterproof, portable storage container for storing financial/legal documents and financial/legal help documents has an upper case molding having a top wall and four sidewalls defining an upper case cavity and a bottom case molding having a bottom wall and four sidewalls defining a bottom case cavity. A financial/legal document retention device is selectively secured to one of the upper case molding and the bottom case molding, for storing financial and legal documents, said financial/legal document retention device having a plurality of folders to store a plurality of classes of documents, and being a generally rectangular accordion-like file folder system wherein each of the folders is moveably flippable. The storage container further includes a computer-readable-medium holder, selectively secured to the bottom case molding, which stores at least one computer-readable medium having encoded thereon financial/legal help documents. There is at least one compartment in the bottom case molding that secures at least one printed medium containing advice on financial and legal matters. An electronic visual signaling device is stored inside one of the upper case molding and the bottom case molding and the electronic visual signaling device is capable of being observed from outside the case.

18 Claims, 5 Drawing Sheets

ULTIMATE PROTECTION PORTFOLIO

FIELD OF INVENTION

The present invention is directed generally to a case for storing financial and legal documents, and mores specifically to a case for storing financial and legal documents further including materials to help prepare financial and legal documents.

BACKGROUND

Cases for storing documents have been around for nearly as long as man has been writing. Even the scribes of ancient Egypt carried briefcase-like storage units. However, what is needed is a case that is specifically designed to store one's important financial and legal documents and to safeguard those documents against possible environmental hazards. Furthermore, what is needed is a one-stop-shop for financial and legal documents, that is, a case, for not only storing financial and legal documents, but also a case including computer-readable mediums having printable important legal and financial forms and the case further including printed media to help one fill out those important forms and otherwise manage one's legal and financial affairs.

DETAILED DESCRIPTION

Embodiments of the present invention are directed to a case with a storage compartment for storing financial and legal documents such as power of attorney forms, wills and trusts. The case further includes documents and materials for helping one fill out such forms and storage compartments to contain those help documents. The case is designed to be liquid and air tight such that it will not allow liquid or air into the case once it is closed. The case is further designed to include an electronic visual signal so that it will be easily located in low light situations.

Figure 6:
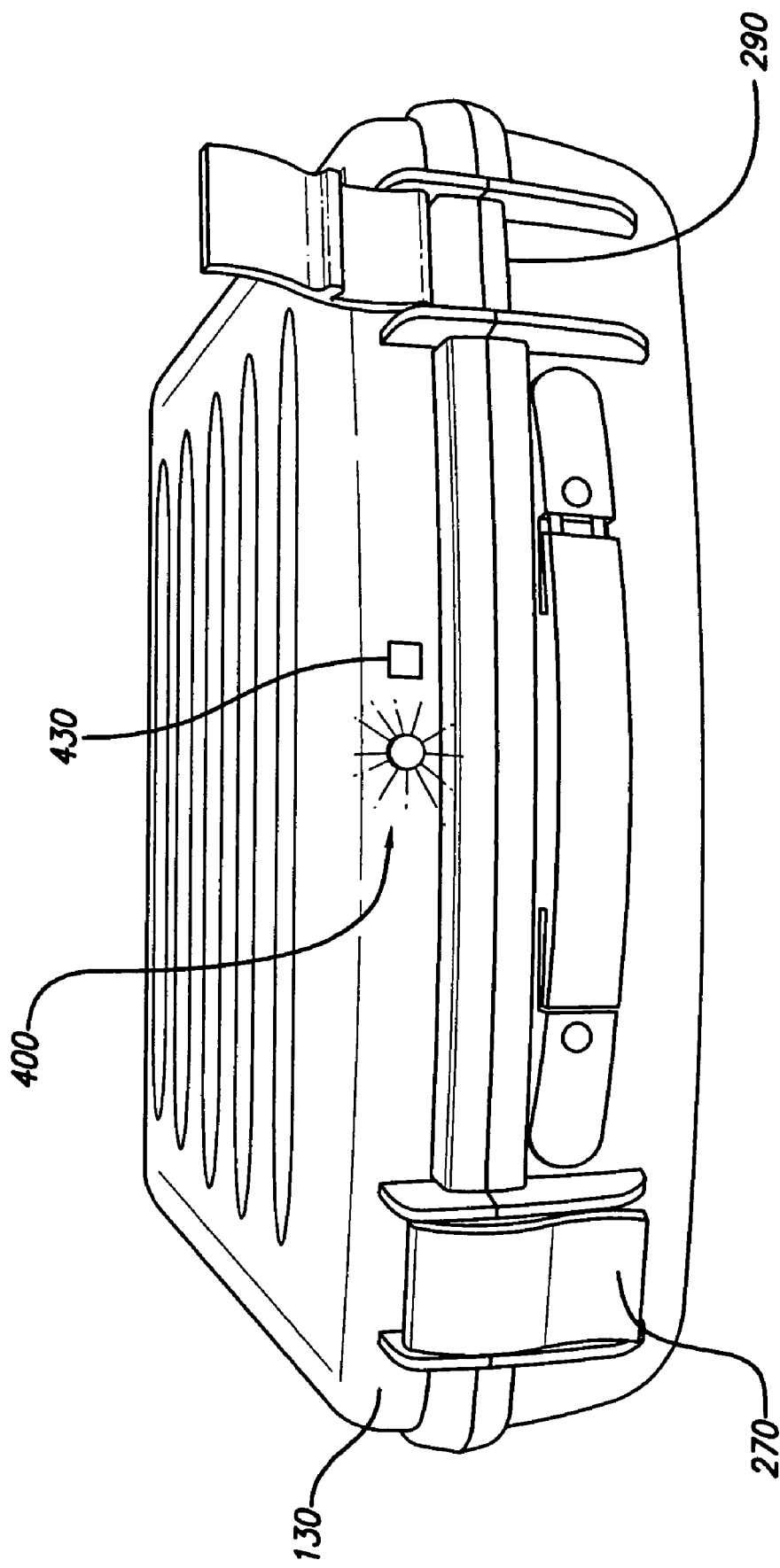
FIG. 6 shows a top-front outside view the closed case, according to an embodiment of the present invention.

FIGURE I depicts a case according to an embodiment of the present invention. An upper case molding 110 has a top wall 120, a front wall 130, a back wall 150, and two sidewalls 170, that form an upper cavity 250. The front wall 130, back wall 150, and two sidewalls 170 each contain an inside upper lip 190, and an outside upper lip 200 separated by an upper lip cavity 230. Latches 270 (See FIG. 6) are secured to the upper case molding 110 on the outside of the front wall 130. A bottom case molding 310 has a bottom wall 320 and it also has a front wall 140, a back wall 160, and two sidewalls 180 to form a bottom cavity 260. The bottom cavity 260 is about twice as deep as the upper cavity 250. A hinge 280 connects the upper case molding 110 to the bottom case molding 310 at the back walls 150, 160 of both the upper case molding 110 and the bottom case molding 310. The front wall 140, back wall 160, and two sidewalls 180 each contain an inside lower lip 210, and an outside lower lip 220 separated by an lower lip cavity 240. The front wall 140 of the bottom case molding 310 may include latch groves 290 to mate with the latches 270 of the upper case molding 110.

In a preferred embodiment, the upper case molding 110 and the bottom case molding 310 are constructed of high impact, rigid, translucent plastic, however other embodiments may construct the moldings from a heat resistant material or from a high density metal.

A sealing member 235 is located within the upper lip cavity 230. The sealing member 235 ensures a tight fit between the upper half of the case (the upper case molding 110) and the lower half of the case (the lower case molding 310). In a preferred embodiment, the sealing member 235 is constructed from rubber, however in other embodiments it may be constructed from silicone, malleable plastic, high density foam, or any other type of material that will ensure a tight fit between a top half of a case and a lower half of the case. Preferably, the material will ensure such a tight fit so as to ensure that, when the case is closed, the case is watertight and airtight, so that neither liquid nor gas, can enter the case and possibly destroy the contents thereof. While in a preferred embodiment, the sealing member is located within the upper lip cavity 230 with a slight modification to the design, it may also be located in the lower lip cavity 240.

Figure 5:
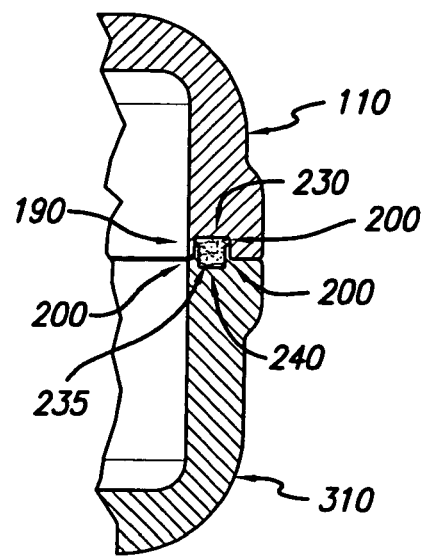
FIG. 5 shows an exploded view of the sealing member and related elements in a closed position of the case according to an embodiment of the present invention.

The upper case molding 110 secures to the bottom case molding 310 by mating the latches 270 with the latch groves 290. When closed, the inside upper lip 190 lies to the inside of the inside lower lip 210 (See FIG. 5). The inside lower lip 210 is located between the inside upper lip 190 and outside upper lip 200 so that it is pressing against the sealing member 235 located in the upper lip cavity 230. When the sealing member 235 presses against the inside lower lip 210 it creates a seal that preferably does not allow liquid or gas into the case. When the case is watertight and the moldings 110, 310 are made from plastic, the case should float in water. This is advantageous if a sudden flood were to strike.

An electronic visual signaling device 400 (See FIG. 6) is secured to the inside of the front wall 130 of the upper case molding 110. The electronic visual signaling device 400 is encased within its own housing 410 so as to protect the wiring and circuit board of the electronic visual signaling device 400. The electronic visual signaling device 400 is capable of being observed from outside the case and is intended to help locate the case in low light situations such as a black out, or in a dark closet. In a preferred embodiment, the electronic visual signaling device 400 is a blinking light emitting diode (LED). The electronic visual signaling device 400 may be capable of being selectively switched on and off via a switch 420 located on the wall of the electronic visual signaling device's housing 410 facing the inside of the case. Alternatively, the switch 420 may be placed on the outside front wall 130, but extra precautions will then be necessary to ensure that the switch does not allow water in that may otherwise shirt circuit the electronics or even flood the case.

The electronic visual signaling device may also include a photoelectric cell 430 that operationally powers on the electronic visual signaling device when it senses low light situations. Such a feature ensures that the batteries of the electronic visual signaling device 400 are not utilized when the case can otherwise be easily located such as in daylight situations. The photoelectric cell 430 may be incorporated with or without the switch 420. If the photoelectric cell 430 is incorporated with the switch 420, the switch may be a tri-position switch having three settings corresponding to Off (the electronic visual signaling device 400 is always off), Auto (the electronic visual signaling device 400 is powered on only in low light situations), and On (the electronic visual signaling device 400 is always on). If the photoelectric cell 430 is included without a switch 420, it may operationally power on the electronic visual signaling device 400 when the case is located in a low light situation (a dark closet, the rafters of a house, or in a room when the lights have been turned out). While in an embodiment of the present invention, the electronic visual signaling device 400 may be located on the front wall 130 of the upper case molding 110, in other embodiments of the present invention, the electronic visual signaling device 400 may be included anywhere in the case such that is capable of being observed from the outside of the case, when it is powered on.

Figure 3:
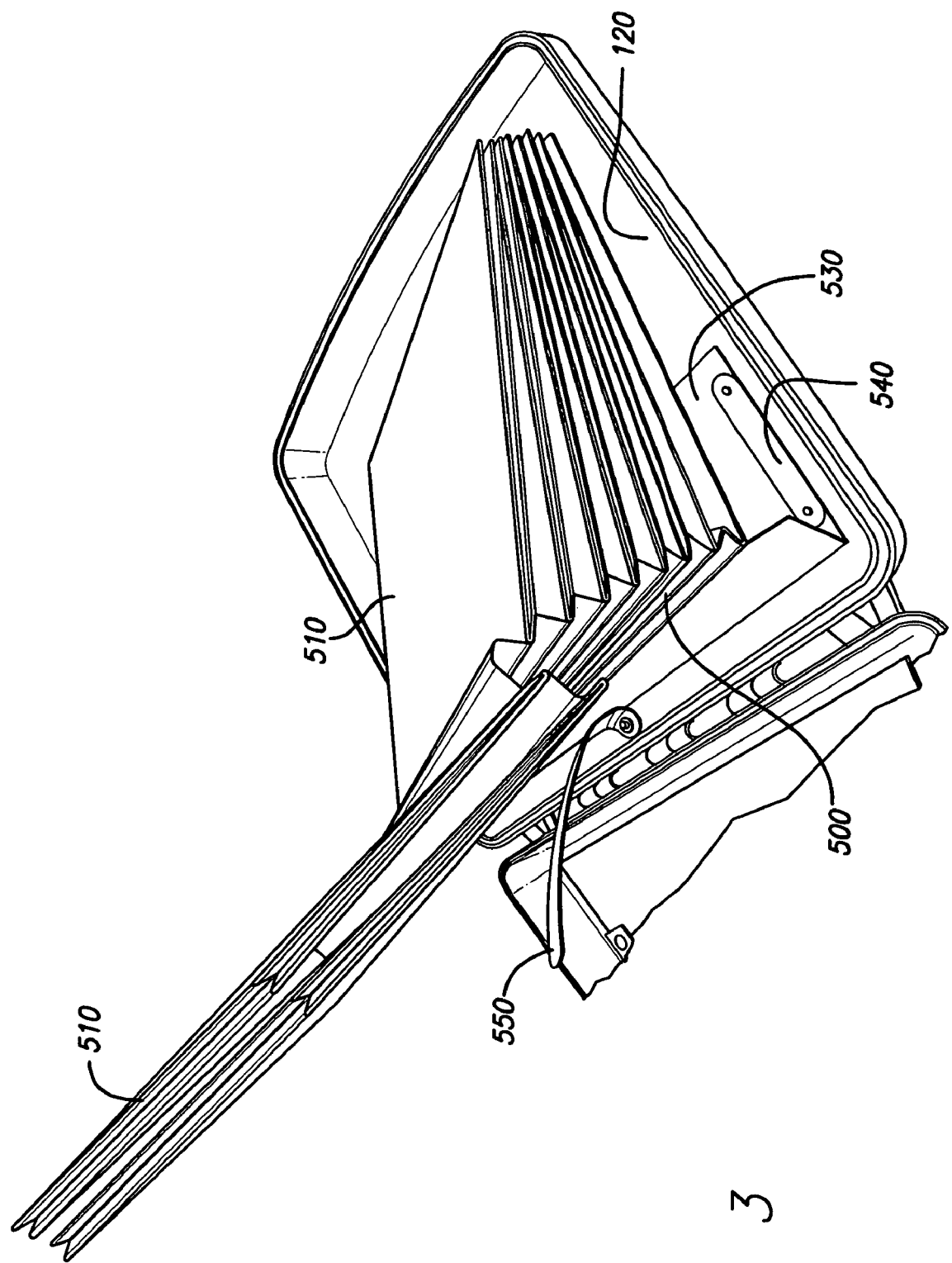
FIG. 3 shows a document retention device according to an embodiment of the present invention.

The upper case molding 110 also contains a document retention device 500 in which to store financial and legal documents which one has created. In a preferred embodiment of the invention, the document retention device 500 is an accordion-like file folder such that documents of different classes (i.e., power of attorney forms, wills, trusts, social security, tax records, credit/debt records, insurance records, etc.) have their own folder 510. (See FIG. 3) However, other document retention devices may be employed, including a plurality of folders coupled together such that one may flip through the folders rather than pulling the folders out accordion style. In another embodiment, the document retention device 500 may both be accordion-like and flippable. Preferably, the folders have pre-printed headings 520 to indicate what classes of documents are to be filed in the particular folder. In a preferred embodiment of the invention, the document retention device 500 includes a back panel 530 secured to the top wall 120 of the upper case molding 110 by a plurality of mounting plates 540 that are screwed into the top wall 120, however, many other techniques may be employed to secure the document retention device 500 to the case including utilizing a single mounting plate, glue, snaps, or velcro. In a preferred embodiment, the document retention device 500 is made from paper or card-stock to reduce the weight, however, a heat resistant material such as aluminum may also be employed. While in an embodiment of the present invention, the document retention device 500 is secured to the upper case molding 110, it may be mounted to the lower case molding 310 as well without departing from the spirit of the invention. In a preferred embodiment of the present invention, a plurality of fasteners 550, for example, velcro straps, are secured to the top wall 120 and couple together in front of the document retention device 500 at a side of the document retention device 500 that is opposite the top wall 120, such that the document retention device 500 is further secured to the upper case molding 110 and it is less likely that documents will fall out of their individual folders 510 during transportation or storage.

The case also contains an electronic medium storage device 600 for storing a plurality of electronic mediums 610 containing materials to assist a user in drafting financial and legal documents. In a preferred embodiment of the invention, the electronic medium storage device 600 is a substantially rectangular, thin plastic sheet having cutouts on both sides to accommodate the electronic mediums. The electronic mediums 610 may be compact discs (CDs), digital video discs (DVD's), floppy disks, hard discs, or any other medium suitable for storing materials (forms, advice, etc.) that may help a user in drafting financial and legal documents. Preferably, the electronic mediums 610 operate on a computer. Preferably, the electronic mediums 610, CD's for example, are packaged with the case inside the electronic medium storage device 600.

Figure 1:
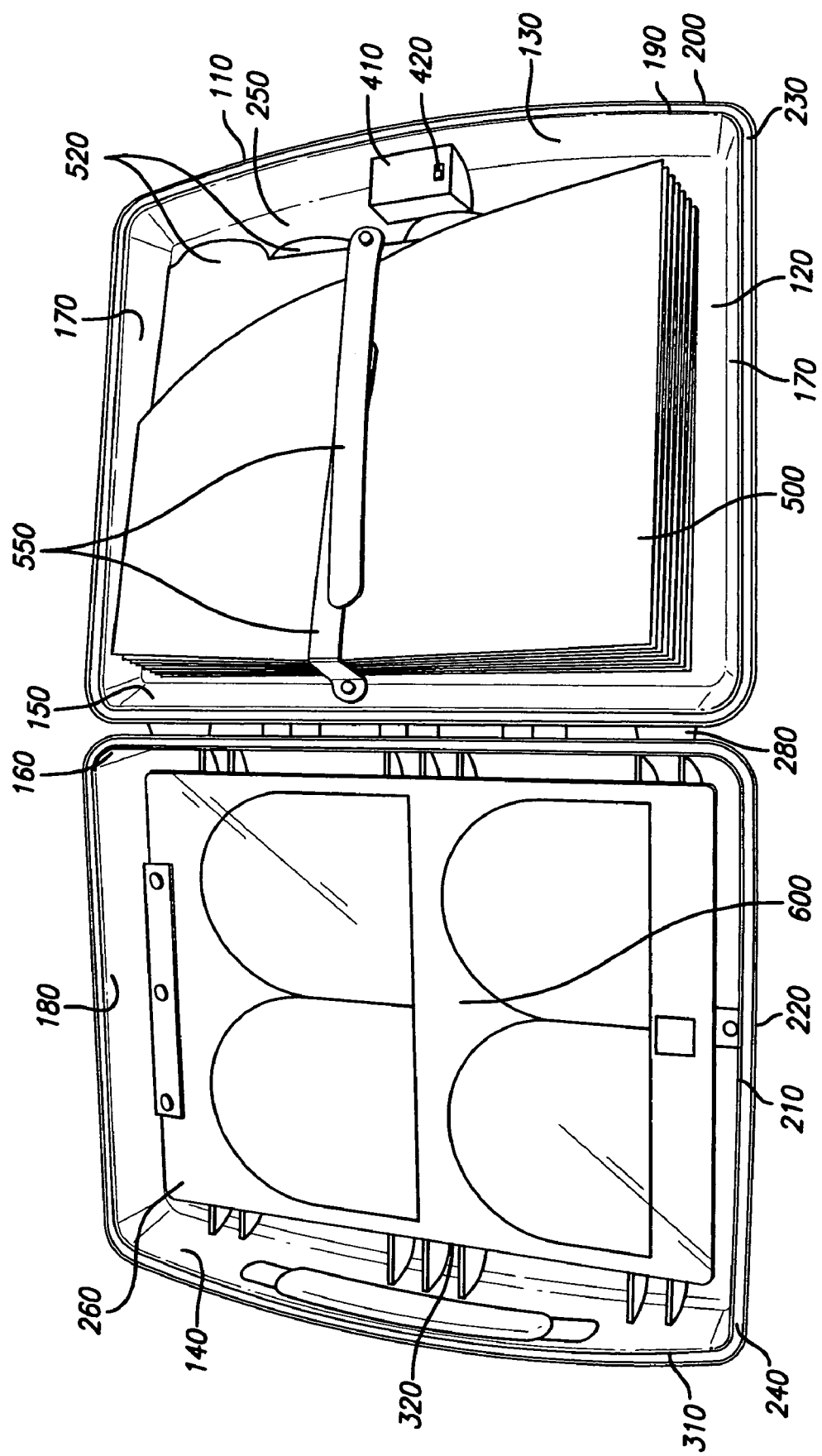
FIG. 1 shows an exploded view of a case according to an embodiment of the present invention.
Figure 2A:
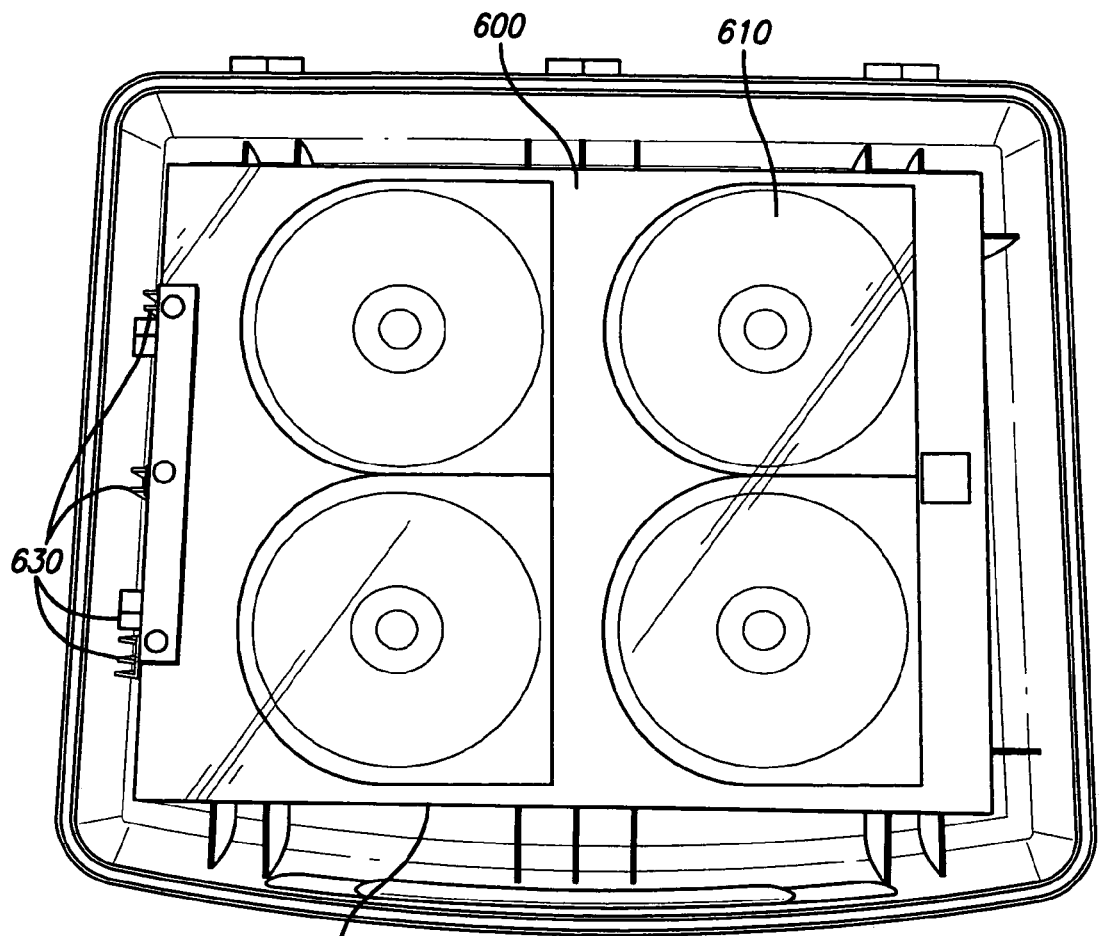
FIG. 2A shows a top down view of the bottom half of the case according to an embodiment of the present invention.
Figure 2B:
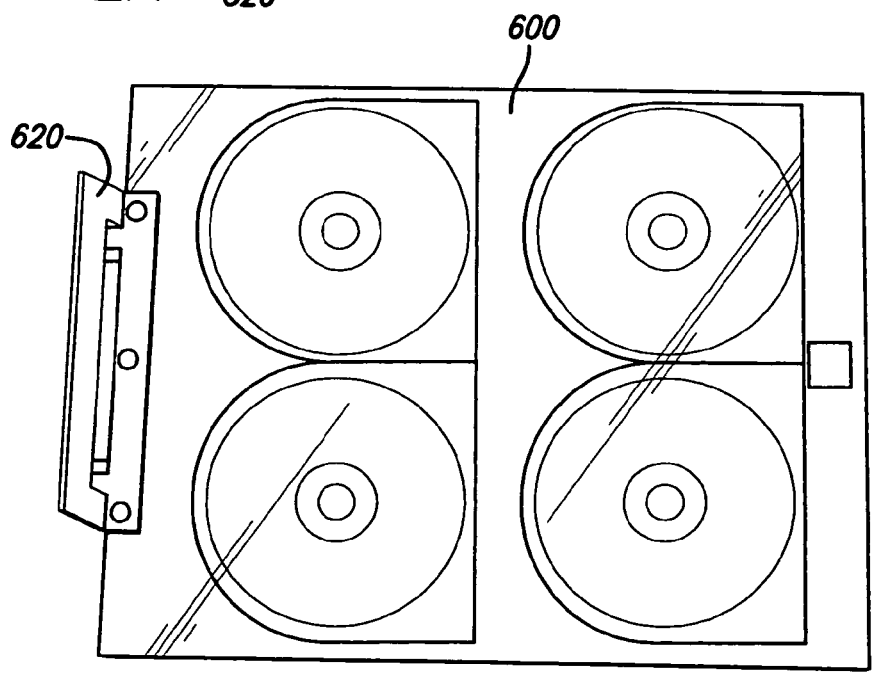
FIG. 2B shows an electronic medium storage device and a hinge insert according to an embodiment of the present invention.

The electronic medium storage device 600 is hinged to a wedge insert 620 (See FIG. 2B) that is adapted to fit in a plurality of moldings 630 located on a sidewall 180 of the bottom case molding 310. The wedge insert 620 is hinged to the electronic storage device 600 such that that the electronic storage device lies in a parallel plane to the bottom wall 320 and substantially perpendicular to the wedge insert 620 when it is in its storage position. The electronic medium storage device 600 is capable of being flipped up such that the electronic medium storage device 600 lies in the same plane as the wedge insert 620 and is in a plane perpendicular to the bottom wall 320. This facilitates access to materials stored beneath the electronic medium storage device 600.

Figure 4:
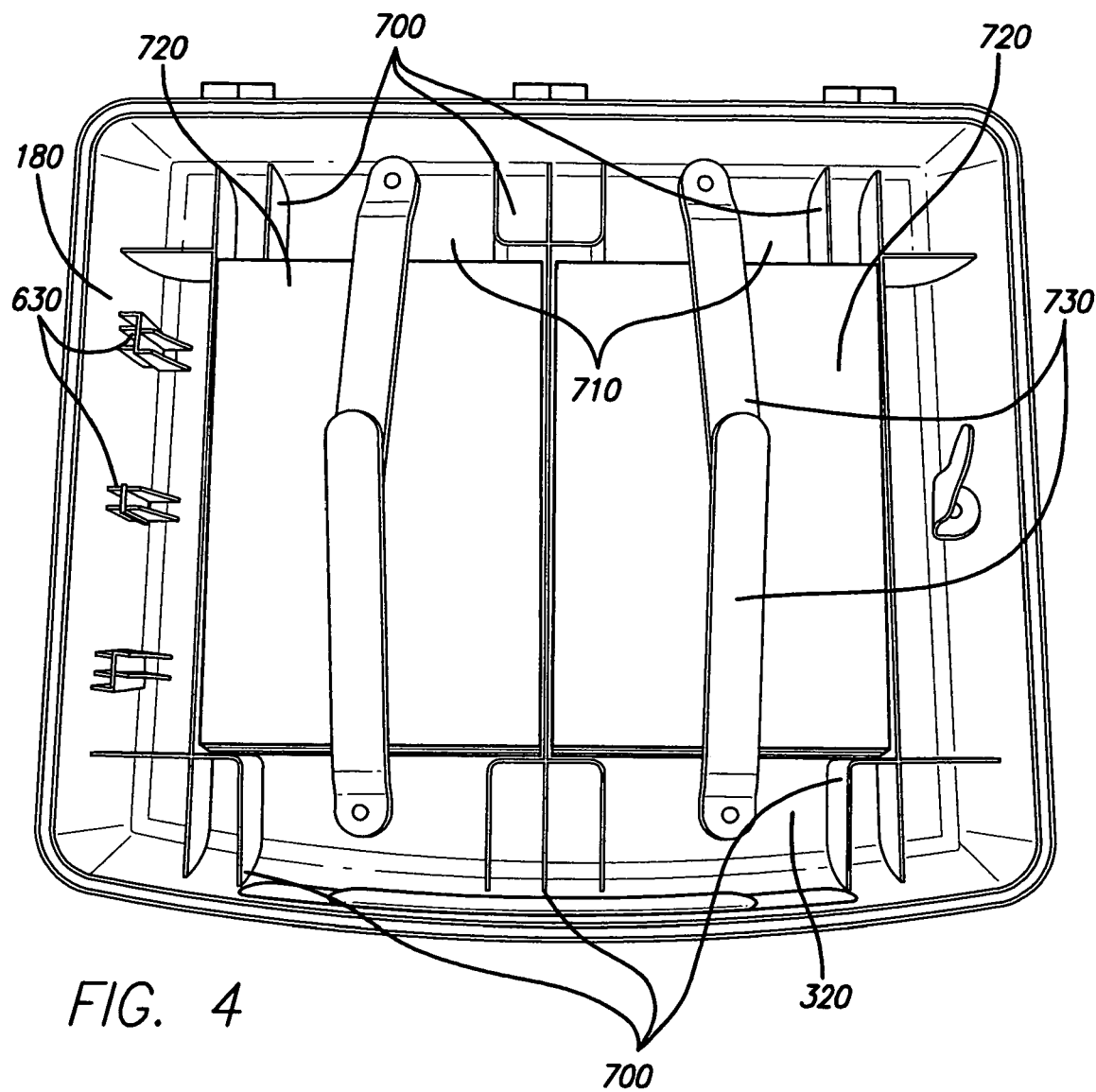
FIG. 4 shows a printed medium storage compartment in the bottom case molding according to an embodiment of the present invention.

The bottom wall 320 also includes a plurality of moldings 700 that form a plurality of compartments 710 in the bottom cavity 260 of the case. (See FIG. 4) These compartments 710 are for storing printed media 720 such as books and pamphlets that instruct a user how to fill out legal and financial forms and that give advice of a legal and financial nature. Preferably, the printed media 720 is included in the case. In an embodiment of the present invention, the moldings 700 form two compartments 710 that are each approximately 8.5 inches in length and 5.5 inches wide.

A plurality of fasteners 730, velcro straps for example, may be secured to the bottom wall 320 in such a fashion that the fasteners 730 couple together over the compartments 710 in order to more firmly secure the printed media 720 to the bottom wall 320 of the bottom case molding 310. The fasteners 730 ensure that the printed media 720 stay in place and do not rattle around the case during transportation or storage.

While the description above refers to a particular embodiment of the present invention, it will be understood that many modifications may be made without departing from the spirit thereof. The accompanying claims are intended to cover such modifications as would fall within the true scope and spirit of the present invention. The presently disclosed embodiments are therefore to be considered in all respects as illustrative and not restrictive, the scope of the invention being indicated by the appended claims, rather than the forgoing description, and all changes that come within the meaning and range of equivalency of the claims are therefore intended to be embraced therein.

What is claimed is:

1. A waterproof, portable storage container for storing financial/legal documents and financial/legal help documents comprising:

an upper case molding having a top wall and four sidewalls defining an upper case cavity;

a bottom case molding having a bottom wall and four sidewalls defining a bottom case cavity;

a financial/legal document retention device, selectively secured to one of the upper case molding and the bottom case molding, for storing financial and legal documents, said financial/legal document retention device having a plurality of folders to store a plurality of classes of documents, and being a generally rectangular accordion-like file folder system wherein each of the folders is moveably flippable;

a computer-readable-medium holder, selectively secured to the bottom case molding, storing at least one computer-readable medium having encoded thereon financial/legal help documents;

at least one compartment in the bottom case molding securing at least one printed medium containing advice on financial and legal matters;

an electronic visual signaling device stored inside one of the upper case molding and the bottom case molding, wherein the electronic visual signaling device is capable of being observed from outside the case.

2. The waterproof, portable storage container of claim 1 wherein the electronic visual signaling device is a light emitting diode.

3. The waterproof, portable storage container of claim 1 wherein the molding is formed of a translucent plastic.

4. The waterproof, portable storage container of claim 1 wherein the first document retaining device is secured to the top wall of the upper case molding by a plurality of mounting plates.

5. The waterproof, portable storage container of claim 4, further including a plurality of fasteners secured to the top wall of the upper case molding and which attach to each other on a side of the document retention device opposite the top wall and which further secure the document retaining device to the top wall.

6. The waterproof, portable storage container 1, wherein the document retaining device is pre-printed with labels identifying the plurality of classes of documents.

7. The waterproof, portable storage container of claim 1, wherein the plurality of computer-readable mediums is a plurality of compact discs.

8. The waterproof, portable storage container of claim 1, wherein the electronic visual signaling device is powered on by a switch.

9. The waterproof, portable storage container of claim 1 wherein the electronic visual signal is powered on by a light-sensitive photoelectric cell.

10. A portable case for storing financial/legal documents comprising:

an upper case molding having a top wall, a front wall, a back wall, and two sidewalls, and the front wall, the back wall, and the two sidewalls slope downwardly and outwardly to form an upper cavity, wherein the front wall, the back wall, and the two sidewalls each contain an inside upper lip and an outside upper lip separated by an upper lip cavity, and wherein a plurality of latches are secured to an outside front wall;

a sealing member located within the upper lip cavity;

an electronic visual signaling device capable of being selectively turned on, said electronic visual signaling device being substantially contained within a plastic molding located on an inside front wall of the upper case molding, and said electronic visual signaling device being observable from the outside front wall;

a document retaining device having a plurality of folders to store a plurality of classes of documents; said document retaining device being a generally rectangular accordion-like file folder system secured to an inside wall of one of the upper case molding and a bottom case molding, wherein each of the folders is moveably flippable;

the bottom case molding having a bottom wall, a front wall, a back wall, and two sidewalls, and the front wall, the back wall, and the two sidewalls slope upwardly and outwardly to form a bottom cavity, wherein the front wall, the back wall, and the two sidewalls each contain an inside bottom lip and an outside bottom lip separated by a bottom lip cavity, and an outside front wall contains a plurality of latch grooves, wherein, the upper case molding secures to the bottom case molding by selectively securing the plurality of latches to the plurality of latch grooves, and the rubber sealing member engages the inside bottom lip such that it forms a generally air and liquid tight seal;

an electronic medium retaining device for retaining a plurality of electronic mediums, said electronic medium retaining device being selectively secured to at least one of the two sidewalls of the bottom case molding;

a plurality of electronic mediums having stored thereon a plurality of form documents to assist a user in preparing financial and legal documents;

a plurality of moldings located on an inside bottom wall of the bottom case molding, said moldings located so as to create a plurality of compartments for storing printed media;

a plurality of print media, stored in said plurality of compartment, wherein said plurality of print media contains advice on financial and legal matters; and a plurality of fasteners secured to the inside bottom wall of the bottom case molding for securing said printed media in the plurality of compartments.

11. The portable case of claim 10 wherein the electronic visual signaling device is a light emitting diode.

12. The portable case of claim 10 wherein the molding is formed of a translucent plastic.

13. The portable case of claim 10 wherein the first document retaining device is secured to the top wall of the upper case molding by a plurality of mounting plates.

14. The portable case of claim 13, further including a plurality of fasteners secured to the top wall of the upper case molding and which attach to each other on a side of the document retention device opposite the top wall and which further secure the document retaining device to the top wall.

15. The portable case of claim 10, wherein the document retaining device is pre-printed with labels identifying the plurality of classes of documents.

16. The portable case of claim 10, wherein the plurality of electronic mediums is a plurality of compact discs.

17. The portable case of claim 10, wherein the electronic visual signaling device is powered on by a switch.

18. The portable case of claim 10 wherein the electronic visual signal is powered on by a light-sensitive photoelectric cell.

* * * * *